(12) United States Patent
Quinn et al.

(10) Patent No.: US 11,360,693 B2
(45) Date of Patent: Jun. 14, 2022

(54) IDENTIFYING POINT-IN-TIME ASYNCHRONOUS APPLICATION DATA

(71) Applicant: EMC IP Holding Company LLC, Hopkinton, MA (US)

(72) Inventors: Brett A. Quinn, Lincoln, RI (US); Douglas E. LeCrone, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 16/884,561

(22) Filed: May 27, 2020

(65) Prior Publication Data
US 2021/0373794 A1    Dec. 2, 2021

(51) Int. Cl.
*G06F 3/06* (2006.01)
*H04L 67/1097* (2022.01)

(52) U.S. Cl.
CPC ............ *G06F 3/0653* (2013.01); *G06F 3/061* (2013.01); *G06F 3/067* (2013.01); *G06F 3/0617* (2013.01); *H04L 67/1097* (2013.01)

(58) Field of Classification Search
CPC ............ G06F 11/2082; G06F 11/2089; G06F 16/152; G06F 16/2322; G06F 16/27; G06F 3/0611; G06F 3/065; G06F 3/0653; G06F 3/067; G06F 11/2064; G06F 11/2074; G06F 12/0866; G06F 12/0888; G06F 16/128; G06F 16/178; G06F 16/40; G06F 2212/222; G06F 2212/224; G06F 2212/263
See application file for complete search history.

(56) References Cited

U.S. PATENT DOCUMENTS

| | | |
|---|---|---|
| 9,606,739 B1 | 3/2017 | LeCrone et al. |
| 9,753,663 B1 | 9/2017 | LeCrone et al. |
| 9,811,272 B1 | 11/2017 | LeCrone et al. |
| 9,927,980 B1 | 3/2018 | LeCrone et al. |
| 2018/0121302 A1* | 5/2018 | Miller .................. G06F 3/0644 |

* cited by examiner

*Primary Examiner* — Yong J Choe
(74) *Attorney, Agent, or Firm* — Muirhead and Saturnelli, LLC

(57) ABSTRACT

Maintaining a timestamp indicating when data transferred to a remote storage system was written by a host at a local storage system includes writing a timestamp file at the local storage system, the timestamp file being part of a first chunk of data corresponding to current writes to the local storage system by the host, providing a second chunk at the local storage system, the second chunk being different from the first chunk and corresponding to writes by the host that were begun prior to beginning any of the writes for the first chunk, and transferring the writes for the second chunk to the remote storage system. Each chunk may be assigned a sequence number. The remote storage system may acknowledge receipt after receiving all data for the second chunk. The second chunk may be written to the remote storage system after receiving all data for the second chunk.

18 Claims, 6 Drawing Sheets

IDENTIFYING POINT-IN-TIME ASYNCHRONOUS APPLICATION DATA

TECHNICAL FIELD

This application relates to computer storage systems, and more particularly to the field of transferring data between storage systems and determining a write time for transferred data.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

It may be desirable to copy data from one storage system to another. For example, if a host writes data to a first storage system, it may be desirable to copy that data to a second storage system provided in a different location so that if a disaster occurs that renders the first storage system inoperable, the host (or another host) may resume operation using the data of the second storage system. Such a capability is provided, for example, by the Remote Data Facility (RDF) product provided by Dell EMC of Hopkinton, Mass. With RDF, a first storage system, denoted the "primary storage system" (or "R1") is coupled to the host. One or more other storage systems, called "secondary storage systems" (or "R2") receive copies of the data that is written to the primary storage system by the host. The host may interact directly with the primary storage system, but any data changes made to the primary storage system are automatically provided to the one or more secondary storage systems using RDF. The primary and secondary storage systems may be connected by a data link, such as an ESCON link, a Fibre Channel link, and/or a Gigabit Ethernet link. The RDF functionality may be facilitated with an RDF adapter (RA) provided at each of the storage systems.

For storage systems that are geographically close, data may be synchronously transferred from one storage system to another so that a host write to a first storage system is not acknowledged until the data has been successfully transferred from the first storage system to a second storage system. Storage systems that are geographically distant may transfer data asynchronously. However, in some cases, it is important to preserve the order of dependent write operations since asynchronous data transfers, by themselves, do not guarantee the order of dependent writes. This may be addressed by the SRDF/A data transfer mechanism provided by Dell EMC of Hopkinton, Mass., which is described, for example, in U.S. Pat. No. 9,606,739. The SRDF/A mechanism maintains a collection of non-dependent writes in a chunk that is asynchronously transferred together. Data writes are not acknowledged until a corresponding chunk of data is transitioned to a different state where writes are no longer accepted.

Although SRDF/A maintains write consistency and ordering for dependent writes, it may not be possible at the destination to determine specific timing of particular writes. That is, if a host writes block A, then block B, and then block C, and those writes are dependent, then transferring the writes to a remote site using SRDF/A results in the remote site having either none of the writes, only block A, only blocks A and B, or all of the writes, but a specific time of any of the given writes by a host can not be determined with certainty since SRDF/A is designed to only preserve logical relationships between dependent writes. Moreover, since SRDF/A cycle times and transmission times may vary and may be unpredictable, the specific time that data was written by an application host may not be calculated at the remote storage system. Thus, the data at the remote storage system may not be usable in instances where host data write times may be needed, such as specialized applications that recover application data.

Accordingly, it is desirable to provide a mechanism to determine application host data write times at a remote storage system for data that is asynchronously copied to the remote storage system.

SUMMARY OF THE INVENTION

According to the system described herein, maintaining a timestamp indicating when data transferred to a remote storage system was written by a host at a local storage system includes writing a timestamp file at the local storage system, the timestamp file being part of a first chunk of data corresponding to current writes to the local storage system by the host, providing a second chunk at the local storage system, the second chunk being different from the first chunk and corresponding to writes by the host that were begun prior to beginning any of the writes for the first chunk, and transferring the writes for the second chunk to the remote storage system. Each chunk may be assigned a sequence number. The remote storage system may acknowledge receipt after receiving all data for the second chunk. The second chunk may be written to the remote storage system after receiving all data for the second chunk. Time data in the timestamp file may be independent of transmitting or storing data at the remote storage system. The timestamp file may be written with a current date and time at the local file system. Timestamp information for particular data may be retrieved at the remote storage system by correlating a cycle number for the particular data with a particular timestamp file. Timestamp information for particular data may be retrieved at the remote storage system by retrieving a backup of the timestamp file having a same version as the particular data. Data at the remote storage system may be backed up using a data protection product that maintains multiple versions of the data. The timestamp information may be written by the host.

According further to the system described herein, a non-transitory computer readable medium contains software that maintains a timestamp indicating when data transferred to a remote storage system was written by a host at a local storage system. The software includes executable code that writes a timestamp file at the local storage system, the timestamp file being part of a first chunk of data corresponding to current writes to the local storage system by the host, executable code that provides a second chunk at the local storage system, the second chunk being different from the first chunk and corresponding to writes by the host that were begun prior to beginning any of the writes for the first chunk, and executable code that transfers the writes for the second chunk to the remote storage system. Each chunk may be assigned a sequence number. The remote storage system may acknowledge receipt after receiving all data for the second chunk. The second chunk may be written to the remote storage system after receiving all data for the second chunk. Time data in the timestamp file may be independent of transmitting or storing data at the remote storage system. The timestamp file may be written with a current date and time at the local file system. Timestamp information for particular data may be retrieved at the remote storage system by correlating a cycle number for the particular data with a particular timestamp file. Timestamp information for particular data may be retrieved at the remote storage system by retrieving a backup of the timestamp file having a same version as the particular data. Data at the remote storage system may be backed up using a data protection product that maintains multiple versions of the data. The timestamp information may be written by the host.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides timestamp information indicating when data is written at a local storage system prior to the data being transferred asynchronously to a remote storage system. The timestamp information may be used at the remote storage system to determine when data at the remote stage system was initially written.

Figure 1:
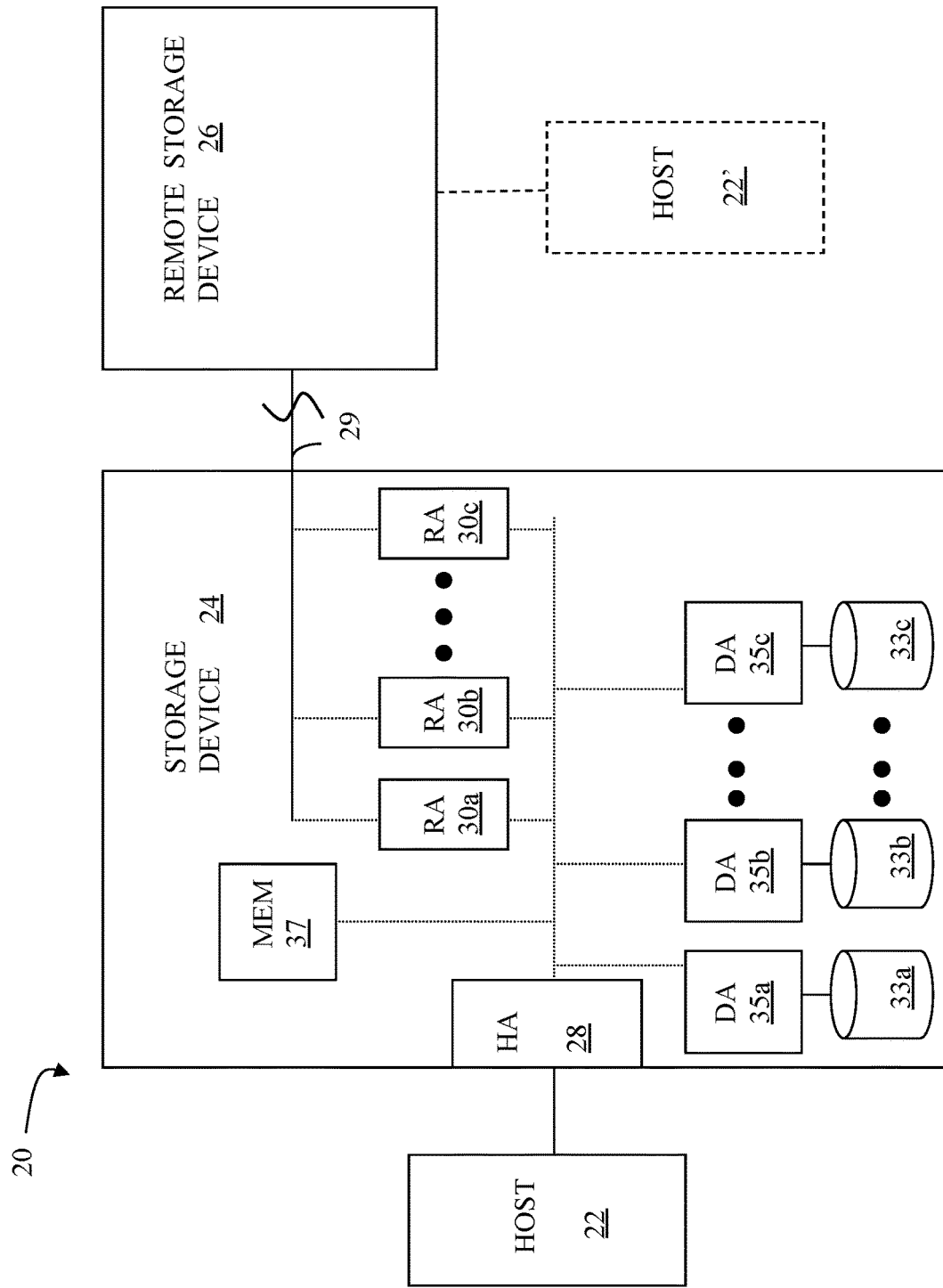
FIG. 1 is a schematic illustration of a storage system showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage systems, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
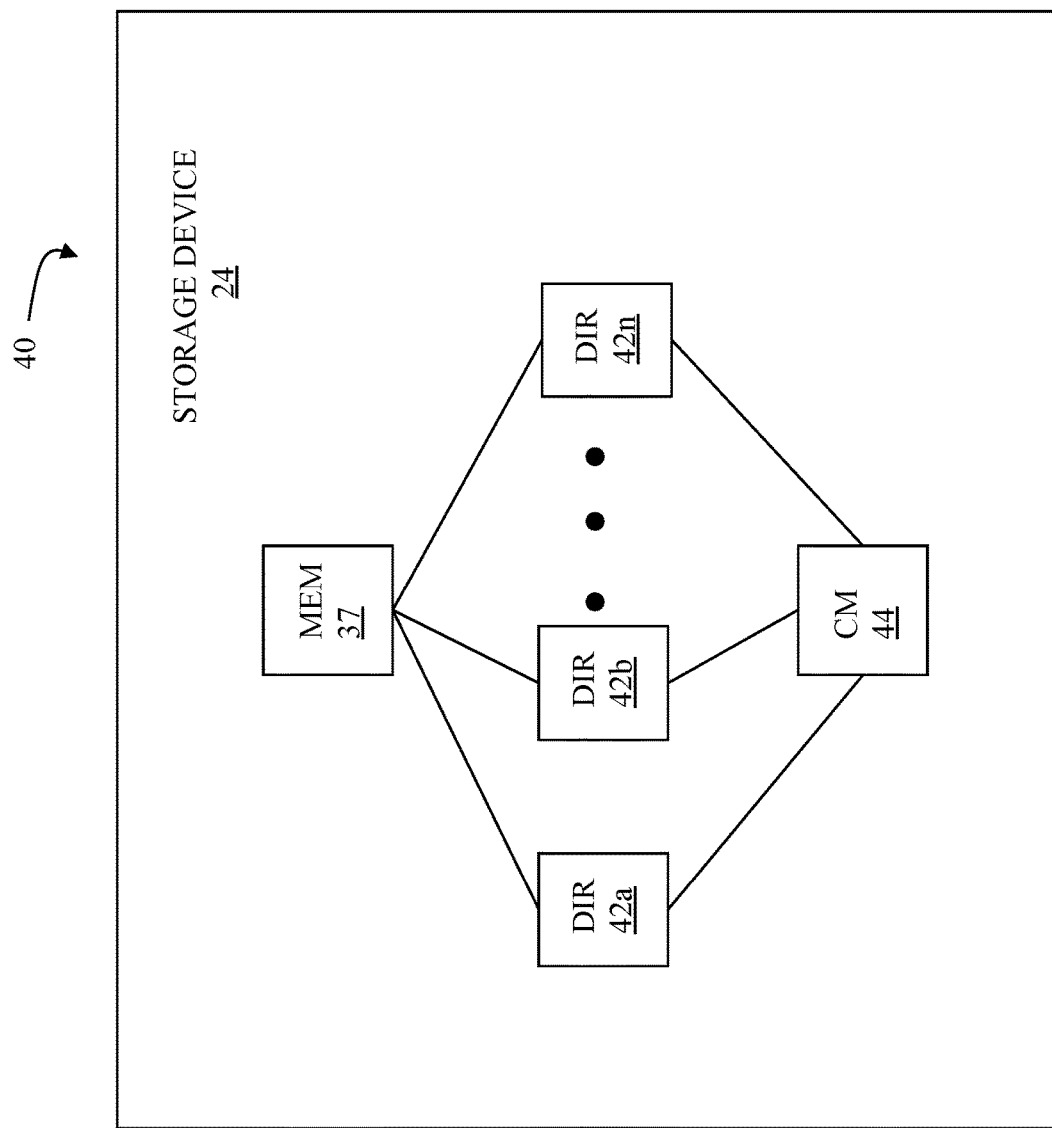
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
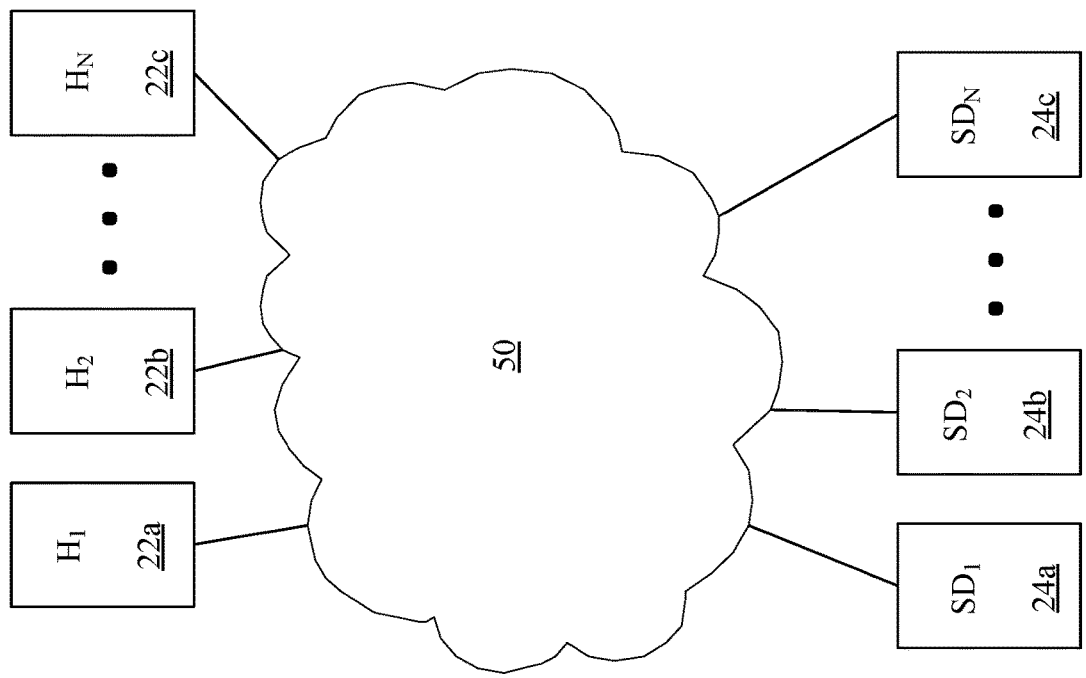
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration showing a storage area network (SAN) 50 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 50. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
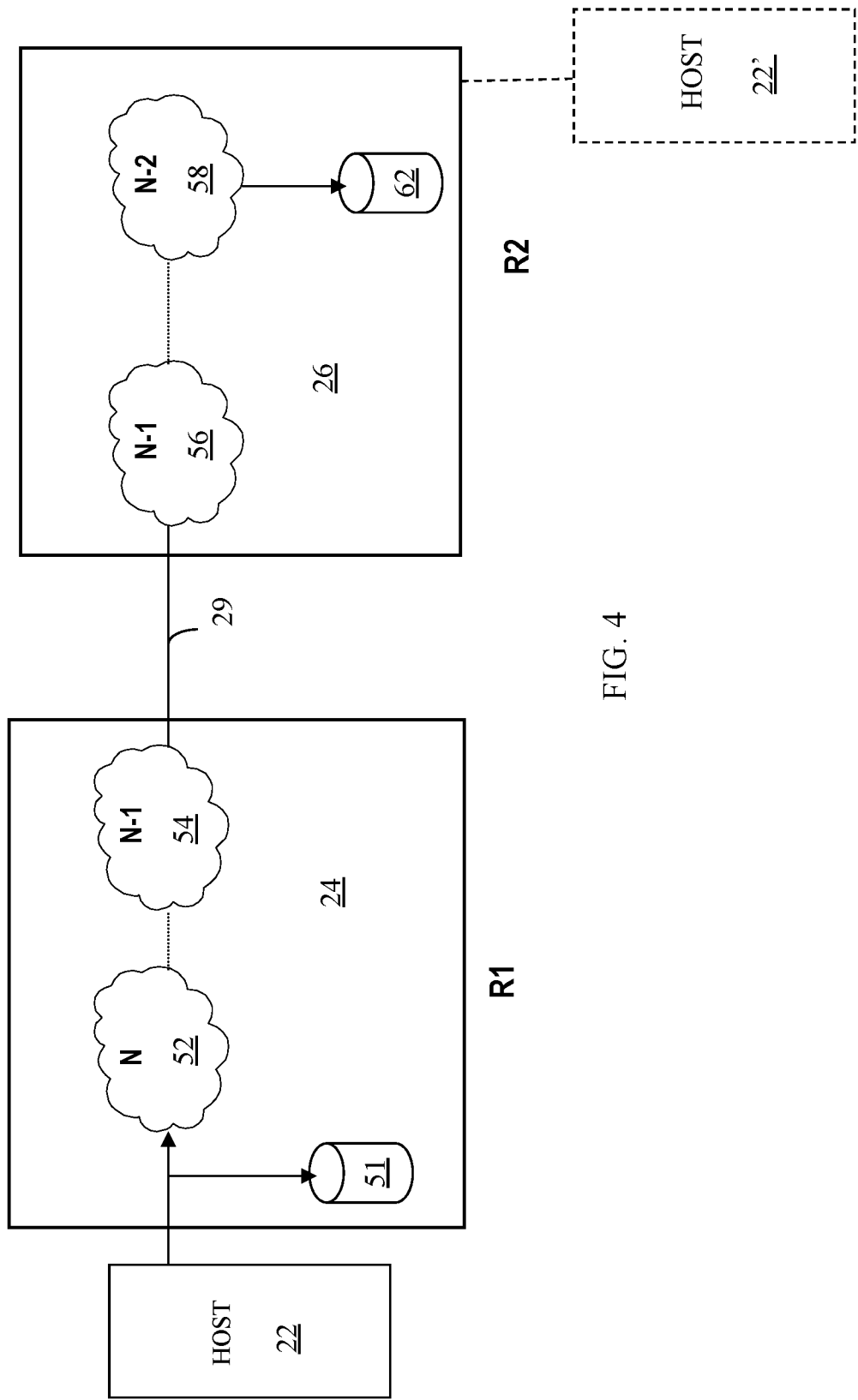
FIG. 4 is a schematic diagram showing a flow of data between a host, a local storage system, and a remote data storage system used in connection with the system described herein.

Referring to FIG. 4, a path of data is illustrated from the host 22 to the local storage system 24 and the remote storage system 26. Data written from the host 22 to the local storage system 24 is stored locally, as illustrated by the data element 51 of the local storage system 24. The data that is written by the host 22 to the local storage system 24 is also maintained by the local storage system 24 in connection with being sent by the local storage system 24 to the remote storage system 26 via the link 29.

In the system described herein, each data write by the host 22 (of, for example a record, a plurality of records, a track, etc.) is assigned a sequence number. The sequence number may be provided in an appropriate data field associated with the write. In FIG. 4, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time.

Generally, the local storage system 24 accumulates chunks of one sequence number while transmitting a previously accumulated chunk (having the previous sequence number) to the remote storage system 26. Thus, while the local storage system 24 is accumulating writes from the host 22 that are assigned sequence number N, the writes that occurred for the previous sequence number (N-1) are transmitted by the local storage system 24 to the remote storage system 26 via the link 29. A chunk 54 represents writes from the host 22 that were assigned the sequence number N-1 that have not been transmitted yet to the remote storage system 26.

The remote storage system 26 receives the data from the chunk 54 corresponding to writes assigned a sequence number N-1 and constructs a new chunk 56 of host writes having sequence number N-1. The data may be transmitted using appropriate RDF protocol that acknowledges data sent across the link 29. When the remote storage system 26 has received all of the data from the chunk 54, the local storage system 24 sends a commit message to the remote storage system 26 to commit all the data assigned the N-1 sequence number corresponding to the chunk 56. Generally, once a chunk corresponding to a particular sequence number is committed, that chunk may be written to the logical storage device. This is illustrated in FIG. 4 with a chunk 58 corresponding to writes assigned sequence number N-2 (i.e., two before the current sequence number being used in connection with writes by the host 22 to the local storage system 26). In FIG. 4, the chunk 58 is shown as being written to a data element 62 representing disk storage for the remote storage system 26. Thus, the remote storage system 26 is receiving and accumulating the chunk 56 corresponding to sequence number N-1 while the chunk 58 corresponding to the previous sequence number (N-2) is being written to disk storage of the remote storage system 26 illustrated by the data element 62. In some embodiments, the data for the chunk 58 is marked for write (but not necessarily written immediately), while the data for the chunk 56 is not.

Thus, in operation, the host 22 writes data to the local storage system 24 that is stored locally in the data element 51 and is accumulated in the chunk 52. Once all of the data for a particular sequence number has been accumulated (described elsewhere herein), the local storage system 24 increments the sequence number. Data from the chunk 54 corresponding to one less than the current sequence number is transferred from the local storage system 24 to the remote storage system 26 via the link 29. The chunk 58 corresponds to data for a sequence number that was committed by the local storage system 24 sending a message to the remote storage system 26. Data from the chunk 58 is written to disk storage of the remote storage system 26.

Note that the writes within a particular one of the chunks 52, 54, 56, 58 are not necessarily ordered. However, every write for the chunk 58 corresponding to sequence number N-2 was begun prior to beginning any of the writes for the chunks 54, 56 corresponding to sequence number N-1. In addition, every write for the chunks 54, 56 corresponding to sequence number N-1 was begun prior to beginning any of the writes for the chunk 52 corresponding to sequence number N. Thus, in the event of a communication failure between the local storage system 24 and the remote storage system 26, the remote storage system 26 may simply finish writing the last committed chunk of data (the chunk 58 in the example of FIG. 4) and can be assured that the state of the data at the remote storage system 26 is ordered in the sense that the data element 62 contains all of the writes that were begun prior to a certain point in time and contains no writes that were begun after that point in time. Thus, R2 always contains a point in time copy of R1 (possibly delayed) and it is possible to reestablish a consistent image from the R2 device. The mechanism for dependent write asynchronous cycle switching illustrated in FIG. 4 is described in more detail in U.S. Pat. No. 9,606,739 to LeCrone, et al., which is incorporated by reference herein.

Figure 5:
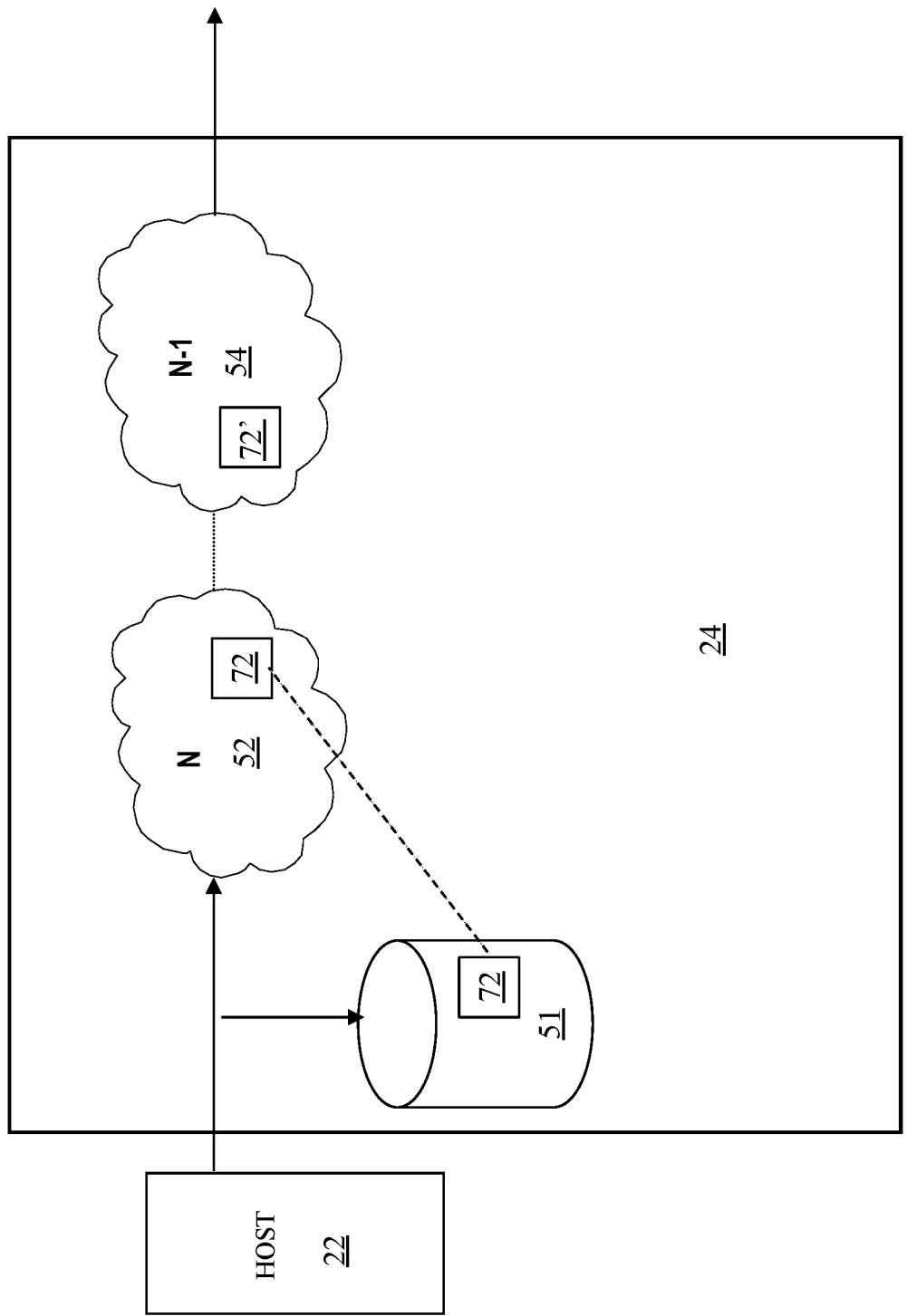
FIG. 5 is a flow diagram illustrating processing performed in connection with providing timestamp information prior to transferring data from a local storage system to a remote storage system according to an embodiment of the system described herein.

Referring to FIG. 5, the local storage system 24 is shown in more detail as including a timestamp file 72 that is stored with the data element 51, discussed above. As described in more detail elsewhere herein, the host 22 may periodically write to the timestamp file 72 to indicate a current time. Since the timestamp file 72 is part of data being written during a current cycle (the N cycle, described above), the timestamp file 72 is shown as being part of the chunk 52. In an embodiment herein, the timestamp file 72 is written by the host more frequently than an expected frequency of cycle switches. The information that is written may include a current time and date, an SMF (system management facility) ID, and other possible system, status, or other information that may be useful.

After a cycle switch occurs, whatever had been written most recently to the timestamp file 72 is maintained as the timestamp file 72 transitions with all of the other data in a chunk to a different chunk that is to be transmitted to the remote storage system 26 (not shown in FIG. 5). This is illustrated by the timestamp file 72' shown in the chunk 54. Note that the timestamp file 72' is essentially frozen and does not change following a cycle switch. The timestamp file 72' is transmitted to the remote storage system 26 along with other data from the chunk 54. As described in more detail elsewhere herein, data from the timestamp file 72' may be used to determine a time that corresponding data from the chunk was written by the host 22. Note that time data that is written to the timestamp file is independent of when the corresponding data is transmitted or stored at the remote storage system.

Figure 6:
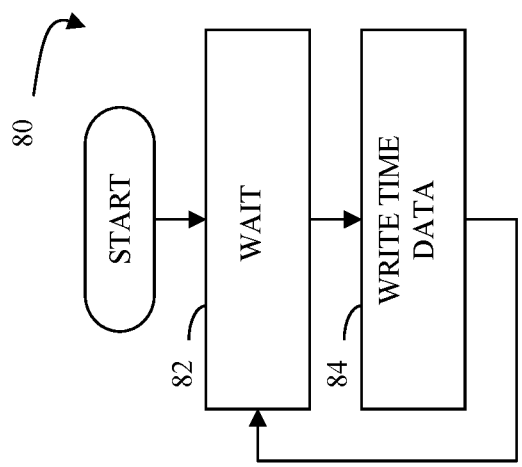
FIG. 6 is a flow diagram illustrating processing performed in connection with determining time stamp information at a remote storage system according to embodiments of the system described herein.

Referring to FIG. 6, a flow diagram 80 illustrates processing performed at the local storage system 24 in connection with writing the timestamp file 72. The processing illustrated by the flow diagram 80 may be performed by the host 22, internally by the local storage system 24, or by any other appropriate computing system. Processing begins at a first step 82 where the system waits a predetermined amount of time. In an embodiment herein, the wait time at the step 82 is a fractional amount of a minimal amount of time expected for each cycle switch. Thus, for example, if each cycle switch is expected to be at least one second from a previous cycle switch, then the wait time at the step 82 could be a half second or a quarter second. Following the step 82 is a step 84 where the timestamp data (discussed above) corresponding to a current date and time at the local file system 24 is written to the timestamp element 72. Following the step 84, control returns to the step 82, discussed above, for another iteration.

Figure 7:
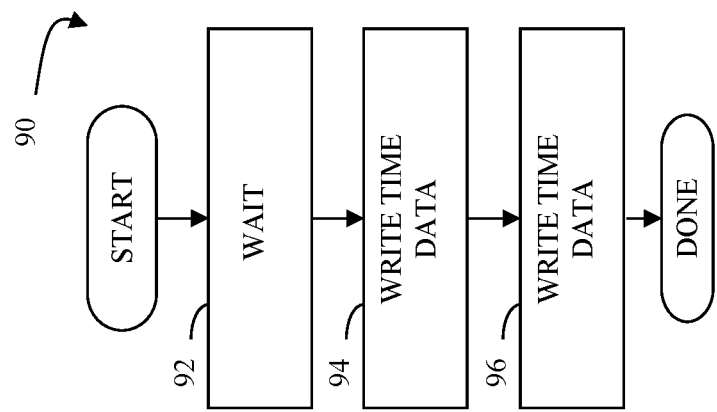
FIG. 7 is a flow diagram illustrating processing performed at a remote storage system in connection with determining a specific time that particular data was written by a host to a local storage system according to embodiments of the system described herein.

Referring to FIG. 7, a flow diagram 90 illustrates processing performed at the remote storage system 26 in connection with determining a specific time that particular data was written by the host 22 to the local storage system 24. The specific time may be useful in a number of situations, including by an application that is able to restore other applications to a particular point-in-time image. The processing illustrated by the flow diagram 90 may be performed by the host 22', internally by the remote storage system 26, or by any other appropriate computing system. Processing begins at a first step 92 where the system determines which chunk (i.e., which cycle number) corresponds to the data that is being examined. The cycle information may be provided with metadata that is saved with the system. Note also that data that had been recently transferred to remote storage system 26 may not have been committed yet or may have been recently committed, and so the cycle number would be the latest or next to latest number.

Following the step 92 is a step 94 where the timestamp file corresponding to the cycle number from the step 92 is determined. As discussed elsewhere herein, the timestamp file indicates when data was written by the host 22 to the local storage system 24. Following the step 94 is a step 96 where the timestamp data from the timestamp file is returned. Following the step 96, processing is complete. In embodiments where data backup functionality is used at the remote storage system 26 to maintain multiple versions of data, the data backup functionality may be used to correlate the data and the corresponding timestamp. For example, if the zDP data backup product is used, the timestamp file from a zDP cycle corresponding to the data of interest may be retrieved at the step 94; a version of the timestamp file having the same backup version as the data of interest may be retrieved. In that case, it may not be necessary to determine a specific cycle corresponding to the data of interest at the step 92.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of maintaining a timestamp indicating when data transferred to a remote storage system was written by a host at a local storage system, comprising:
    setting a sequence number to a first value;
    the host writing data to a chunk of data on the local storage system only while the sequence number equals the first value;
    periodically writing a timestamp file to the chunk of data while the sequence number equals the first value, wherein timestamp information in the timestamp file includes a current date and time at the local storage system that is independent of when the host writes data to the chunk of data;
    setting the sequence number to a second value different from the first value;
    the host writing data to different chunk of data at the local storage system only after the sequence number is set to the second value; and
    transferring the data for the chunk from the local storage system to the remote storage system only after the sequence number is set to the second value.

2. A method, according to claim 1, wherein the remote storage system acknowledges receipt after receiving all data for the chunk.

3. A method, according to claim 1, wherein timestamp information for particular data is retrieved at the remote storage system by correlating the sequence number for the particular data with a particular timestamp file.

4. A method, according to claim 1, wherein the timestamp information for particular data is retrieved at the remote storage system by retrieving a backup of the timestamp file having a same version as the particular data.

5. A method, according to claim 4, wherein data at the remote storage system is backed up using a data protection product that maintains multiple versions of the data.

6. A method, according to claim 1, wherein the timestamp information is written by the host.

7. A non-transitory computer readable medium containing software that maintains a timestamp indicating when data transferred to a remote storage system was written by a host at a local storage system, the software comprising:
    executable code that sets a sequence number to a first value;
    executable code that accepts data written by the host to a chunk of data on the local storage system only while the sequence number equals the first value;
    executable code that periodically writes a timestamp file to the chunk of data while the sequence number equals the first value, wherein timestamp information in the timestamp file includes a current date and time at the local storage system that is independent of when the host writes data to the chunk of data;
    executable code that sets the sequence number to a second value different from the first value;
    executable code that accepts the host writing data to different chunk of data at the local storage system only after the sequence number is set to the second value; and
    executable code that transfers the data for the chunk from the local storage system to the remote storage system only after the sequence number is set to the second value.

8. A non-transitory computer readable medium, according to claim 7, wherein the remote storage system acknowledges receipt after receiving all data for the chunk.

9. A non-transitory computer readable medium, according to claim 7, wherein timestamp information for particular data is retrieved at the remote storage system by correlating the sequence number for the particular data with a particular timestamp file.

10. A non-transitory computer readable medium, according to claim 7, wherein the timestamp information for particular data is retrieved at the remote storage system by retrieving a backup of the timestamp file having a same version as the particular data.

11. A non-transitory computer readable medium, according to claim 10, wherein data at the remote storage system is backed up using a data protection product that maintains multiple versions of the data.

12. A non-transitory computer readable medium, according to claim 7, wherein the timestamp information is written by the host.

13. A storage system, comprising:
a plurality of storage units that store data;
a plurality of disk adapters coupled to the storage units;
a memory coupled to the disk adapters; and
a plurality of host adapters coupled to the memory that provide connectivity to a host, wherein the host adapters and the disk adapters are provided on one or more director boards having at least one processor thereon and having a non-transitory computer readable medium containing software that maintains a timestamp indicating when data transferred to a remote storage system coupled to the storage system was written by the host to the storage system, the software including executable code that sets a sequence number to a first value, executable code that accepts data written by the host to a chunk of data on the storage system only while the sequence number equals the first value, executable code that periodically writes a timestamp file to the chunk of data while the sequence number equals the first value, wherein timestamp information in the timestamp file includes a current date and time at the storage system that is independent of when the host writes data to the chunk of data, executable code that sets the sequence number to a second value different from the first value, executable code that accepts the host writing data to different chunk of data at the storage system only after the sequence number is set to the second value, and executable code that transfers the data for the chunk from the storage system to the remote storage system only after the sequence number is set to the second value.

14. A storage system, according to claim 13, wherein the storage system receives an acknowledgement all data for the chunk has been transmitted.

15. A storage system, according to claim 13, wherein timestamp information for particular data is retrieved at the remote storage system by correlating the sequence number for the particular data with a particular timestamp file.

16. A storage system, according to claim 13, wherein the timestamp information for particular data is retrieved at the remote storage system by retrieving a backup of the timestamp file having a same version as the particular data.

17. A storage system, according to claim 16, wherein data at the remote storage system is backed up using a data protection product that maintains multiple versions of the data.

18. A storage system, according to claim 13, wherein the timestamp information is written by the host.

* * * * *